US007831921B2

(12) United States Patent
Wulfe et al.

(10) Patent No.: US 7,831,921 B2
(45) Date of Patent: Nov. 9, 2010

(54) NAVIGATION CONNECTION POINTS

(75) Inventors: Benjamin S. Wulfe, Redmond, WA (US); David P. Hill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 466 days.

(21) Appl. No.: 11/609,694

(22) Filed: Dec. 12, 2006

(65) Prior Publication Data

US 2008/0141179 A1   Jun. 12, 2008

(51) Int. Cl.
*G06F 3/048* (2006.01)
*G06F 3/00* (2006.01)

(52) U.S. Cl. .................. 715/765; 715/764; 715/853; 715/854

(58) Field of Classification Search ................. 715/854, 715/764, 765, 853
See application file for complete search history.

(56) References Cited

U.S. PATENT DOCUMENTS

| | | | |
|---|---|---|---|
| 5,530,957 A | | 6/1996 | Koenig |
| 6,628,304 B2 | | 9/2003 | Mitchell et al. |
| 7,076,766 B2 | | 7/2006 | Wirts et al. |
| 2001/0013041 A1* | 8/2001 | MacLeod Beck et al. ... 707/500 |
| 2002/0041289 A1 | | 4/2002 | Hatch et al. |
| 2002/0199025 A1* | 12/2002 | Kutay et al. ................. 709/250 |
| 2003/0048286 A1 | | 3/2003 | Lal |
| 2003/0058277 A1* | 3/2003 | Bowman-Amuah ......... 345/765 |
| 2003/0146929 A1* | 8/2003 | Baldwin et al. ............. 345/733 |
| 2003/0179227 A1* | 9/2003 | Ahmad et al. ............... 345/736 |
| 2004/0049776 A1* | 3/2004 | Fomenko et al. ............ 719/328 |
| 2004/0221245 A1 | | 11/2004 | Chickles et al. |
| 2004/0230940 A1* | 11/2004 | Cooper et al. ............... 717/100 |
| 2005/0172264 A1 | | 8/2005 | Yuknewicz et al. |
| 2005/0193361 A1 | | 9/2005 | Vitanov et al. |
| 2005/0193370 A1 | | 9/2005 | Goring et al. |
| 2005/0268249 A1 | | 12/2005 | Calaco-Dias |
| 2006/0143592 A1* | 6/2006 | Bender et al. ............... 717/104 |
| 2006/0184894 A1 | | 8/2006 | Daniels et al. |
| 2006/0200749 A1* | 9/2006 | Shenfield .................. 715/501.1 |
| 2006/0236254 A1* | 10/2006 | Mateescu et al. ............ 715/762 |
| 2006/0242124 A1* | 10/2006 | Fields et al. ................... 707/3 |

FOREIGN PATENT DOCUMENTS

WO   WO2006038003   4/2006

OTHER PUBLICATIONS

Schmidt, Rainer, "Component-based systems, composite applications and workflow-management", Zurich, Sep. 1997, pp. 206-214.
Henn, Juergen, "Object-oriented infrastructure and reusable business components for distributed, multi-platform business applications-implemented entirely in Java", IBM San Francisco, Software—Concepts and Tools 19(1):37-48, 1998.
De Baar, Dennis J.M.J., et al., "Coupling application design and user interface design", May 3-7, 1992, ACM, pp. 259-266.

* cited by examiner

*Primary Examiner*—Steven B Theriault
(74) *Attorney, Agent, or Firm*—Workman Nydegger

(57) ABSTRACT

Navigation connection points for separating navigation business logic from user interface elements. Computer executable instructions are used in a navigation framework for implementing navigation business logic separated from user interface elements. This allows the navigation business logic and user interface elements to be developed separately and later combined. A computer readable storage medium includes computer executable instructions configured to perform navigational tasks. The computer readable storage medium further includes a computer implemented interface operatively connected to the computer executable instruction configured to perform navigational tasks. The computer implemented interface is configured to connect to an external computer implemented user interface module. The computer implemented interface allows an external computer implemented user interface module to be selected from one of a number of external computer implemented user interface modules such that the navigation business logic is not limited to a single user interface implementation.

19 Claims, 2 Drawing Sheets

NAVIGATION CONNECTION POINTS

BACKGROUND

Background and Relevant Art

Computers and computing systems have affected nearly every aspect of modern living. Computers are generally involved in work, recreation, healthcare, transportation, entertainment, household management, etc.

Many computers are intended to be used by direct user interaction with the computer. As such, computers have input hardware and software user interfaces to facilitate user interaction. For example, a modern general purpose computer may include a keyboard, mouse, touchpad, camera, etc for allowing a user to input data into the computer. In addition, various software user interfaces may be available.

Examples of software user interfaces include graphical user interfaces, text command line based user interface, function key or hot key user interfaces, and the like. Generally, the user interface is an integral part of a software application. Further still, the interface is usually so intertwined in the software application with other software code and spread out through the software application that to modify or update the user interface requires numerous code changes throughout the application.

For example, a software application may have a navigational structure to allow navigation of the software application without presenting an overload of information to a user interface. Thus, only applicable user interface elements are displayed for a particular screen view. Illustratively, a mail client application may perform several functions including receiving emails, allowing a user to read received emails, allowing a user to compose emails, and allowing a user to send composed emails. Rather than having user interface elements for all functions available at one time, user interface elements can be limited to the elements applicable to one specific function. Thus, for example, a user interface for displaying received emails may exclude some elements applicable only to composing new emails. Similarly, a user interface for allowing composition of emails may exclude elements only used when reading a received email, such as reply and forward buttons.

As noted previously, to obtain this type of user interface, typically the code used to control UI elements is interspersed with the code used to define the constituent functions of the application and the ways in which the user can transition between constituent functions of the application. Thus, to modify the user interface, such as for example to change the appearance or way in which the navigation code is accessed, user interface code throughout an application is accessed and changed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment may be implemented in a computing environment. A computer readable storage medium may include computer executable instructions usable in a navigation framework for implementing navigation business logic separated from user interface elements. This allows the navigation business logic and user interface elements to be developed separately and later combined. The computer readable storage medium includes computer executable instructions configured to perform navigational tasks. The computer readable storage medium further includes a computer implemented interface operatively connected to the computer executable instruction configured to perform navigational tasks. The computer implemented interface is configured to connect to an external computer implemented user interface module. The computer implemented interface allows an external computer implemented user interface module to be selected from one of a number of external computer implemented user interface modules.

In another embodiment, computer readable storage may include computer executable instructions configured to perform user interface tasks. The computer readable storage may further include a computer implemented interface operatively connected to the computer executable instruction configured to perform user interface tasks. The computer implemented interface is configured to connect to an external computer implemented navigation module.

Yet another embodiment is a method implemented in a computing environment. The method is usable in a navigation framework for implementing navigation business logic separated from user interface elements such that the navigation business logic and user interface elements can be developed separately and later combined. The method includes receiving user input from a user at a user interface. The user input is transmitted to a computer implemented navigation module that is external to the user interface. The computer implemented navigation module is user interface agnostic. A navigation function is performed as specified by the user input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
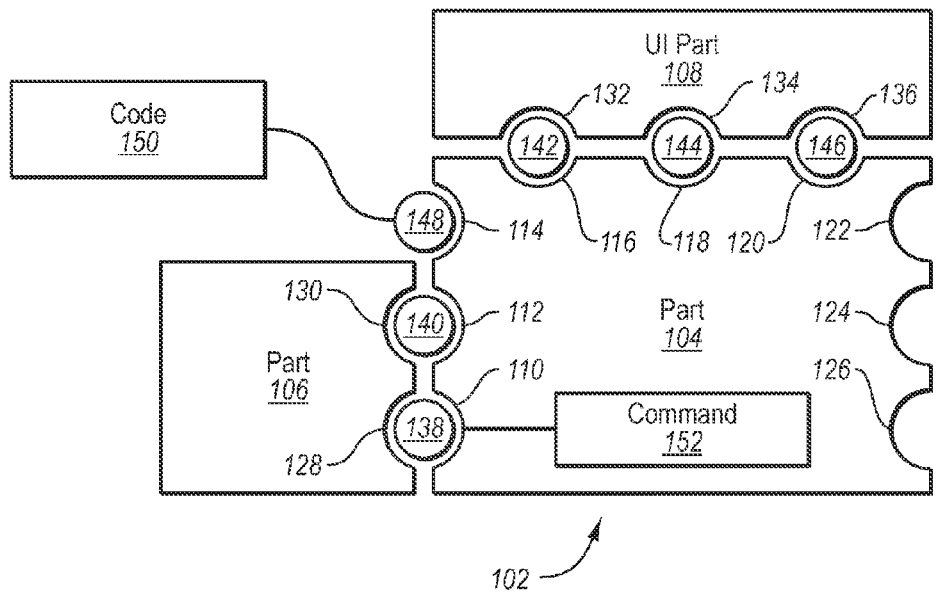
FIG. 1 illustrates a composite module composed of a number of sub-modules and external code.

Embodiments herein may comprise a special purpose or general-purpose computer including various computer hardware, as discussed in greater detail below.

Some embodiments described herein allow for greater flexibility in designing and implementing navigational controls, by implementing separate user interface and business logic portions. Additionally, user interface and business logic portions may be comprised of further separated user interface and business logic portions. As sometimes used herein, a "part" is a re-usable unit of combination. Parts are granular entities that provide self-contained functionality that can be re-used in many different solutions. They define an external contract using a set of connection points that dictate the ways in which the part may communicate with other parts or with its host environment. Parts can be combined together to form higher value, more complex composite parts. Composite parts can be used just like simple non-composite parts. Composite parts can use connection points to define their external contract.

Illustratively, a navigation business logic module part may include connection points to allow the navigation business logic module to logically connect to a user interface module part. The navigation logic module part may further include connection points configured to interface with other navigation logic modules. In this fashion, parts can be created and combined to create a navigation structure. Additionally, parts and/or navigation logic module parts and/or user interface module parts can be pre-made and supplied as reusable components that can be implemented in an application.

By separating the user interface components from the business logic components, several advantages can be obtained. For example, in one embodiment, this allows for custom user interfaces to be created. Additionally, a user interface can be changed individually rather than needing to change code throughout a module to change the user interface.

Re-skinning can be accomplished by simply changing the user interface part code or by replacing the user interface part. Additionally, complete changes in user interface technology can be accomplished without the need to re-code the navigation business logic portions of the application. For example, a user interface module for a graphical user interface for a part may be replaced by a user interface module utilizing shortcut keys or function keys.

Embodiments also include functionality for defining hierarchical workspace controls. A workspace control includes layout functionality to allow a workspace user interface to be automatically and dynamically updated according to the navigational state of the application.

As explained previously, parts can be re-usable. Thus, in one embodiment, a user can create a hierarchical navigation structure that includes parts generated by others. Thus, resources can be reused. Additionally, collaboration can be accomplished without the need for excessive developer interaction.

Advantageously, another embodiment facilitates navigation logical development by grouping common parts. For example, a composite part may include a number of sub-parts. The sub-parts may themselves be composite parts where parts with common functionality is grouped together in a single sub-part. The group of common parts may provide for a grouping of available navigation items, which a user interface module can represent in any appropriate way.

Referring now to FIG. 1, an exemplary composite part 102 is illustrated. By illustrating the composite part 102, several features of some embodiments can be illustrated. For example, the composite part 102 illustrates how lower level sub-parts can be combined into a composite part. Further, the composite part 102 illustrates how various interfaces can be accomplished between parts and/or other external code.

Illustrating now in more detail, composite part 102 includes three lower level parts, part 104, part 106, and user interface (UI) part 108. The parts are connected using connection points (110-136) and connectors (138-148). The connection points define an external contract that dictates the ways in which a part's container or other parts may interact with the part. Specific connection point types define and encapsulate specific patterns of communication. Exemplary patterns of communication include, for example, notifications, command invocations, data exchanges, etc. Connectors represent connections between connection points, or between connection points and workflows. They provide the channels of communication and the logic to manage the interaction between the parts. Connectors may be specific to connection point type pairs.

FIG. 1 further illustrates that part 104 is connected to code 150. The part 104 is connected to code 150 through connection point 114 and an adapter 148. An adapter connects a part's connection point to external modules such as user interface controls or code. Adapters are used to help handle common interaction scenarios between connection points and other elements of the system. For example, adapters can be used to connect a user interface control to a command connection point on a part. This adapter can then automatically manage the control so that its properties or events can be interfaced with the connection point without a significant amount of developer generated code.

FIG. 1 further illustrates a command 152 at part 104 connected through a connection point 110, a connector 138, and a connection point 128 to part 106. A command encapsulates an action that can be carried out by the user. Commands are contained within a part. A part can choose to expose a command via a command connection point so that the command can be invoked by other parts or by the part's hosting environment. Command connection points can define a number of properties. For example, a command connection point may define the following properties: Enabled (specifying whether or not the command is enabled), Name (an identifying name used during design time and for diagnostics at run time), Description (a description of the command functionality), Icon (specifies an icon that can be used by a designer), etc. In one embodiment, the properties can be modified at any time by the part. The command connection point can transmit these property changes, via the connectors or adapters they are connected to, to other parts, code or user interface elements so that they can be notified automatically as the command's state changes.

As alluded to above, several different types of connection points may be implemented. Some illustrative examples are command connection points, data connection points, and navigation connection points. Command connection points have been described previously in connection with the description of command 152 above. A data connection point encapsulates data exchanged between parts. Once the connection point has been connected to another part, the connection point may handle updating the contents of the data using several patterns of data exchange. Navigation connection points are connection points that define a navigation model, as discussed in more detail below, defining what navigation items can be navigated to and proffers events when entries change their state.

Figure 2A:
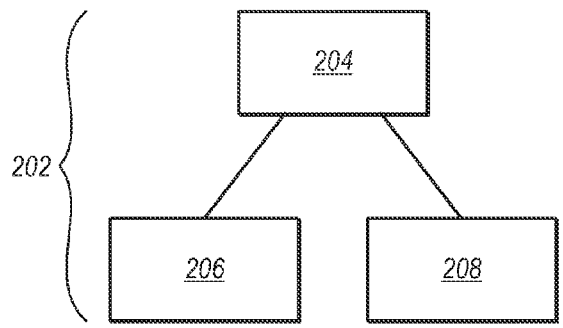
FIG. 2A illustrates a hierarchical navigation structure.
Figure 2B:
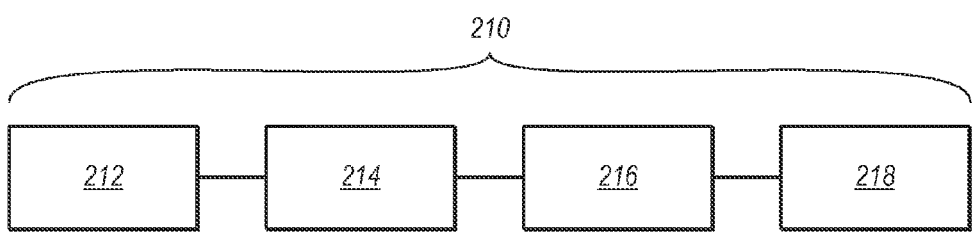
FIG. 2B illustrates a flat navigation structure.

Referring now to FIGS. 2A and 2B, examples of how parts may be used in implementing navigation structures is illustrated. A navigation structure may be defined to define how user interface elements are displayed and/or accessed and how user interaction with the user interface elements controls the underlying business logic to perform some navigation task. For example, a navigation structure 202 is illustrated. The navigation structure 202 includes navigation items 204, 206, and 208.

Each navigation item may include one or more parts such as those illustrated in FIG. 1. For example, a navigation item may include a business logic part such as part 104 and a UI part, such as part 108. Notably, in some embodiments, as will be illustrated later in FIG. 3, a UI part may be shared by different business logic parts. A navigation item, such as navigation items 204, 206, and 208, represents an item that can be navigated to. A navigation item will return a view when navigated to. The view can be displayed or otherwise interacted with, such as with hotkeys, mouse movements, video input, voice commands, etc.

The navigation item can also offer state settings that can be acted on. Such state settings may include settings such as "active" (defining whether or not the navigation item is active), "created", and a "can navigate to" setting (specifying that the navigation item can be navigated to).

As illustrated in FIG. 2A, navigation items can be arranged in a navigation structure in a hierarchical structure. In the hierarchical navigation structure 202, navigation items can be parents to other items. For example, navigation item 204 is a parent to navigation items 206 and 208.

FIG. 2B illustrates an example where navigation items 212, 214, 216, 218 are arranged in a flat navigation structure 210. This may be used, for example to implement a wizard interface where navigation is performed from one interface to the next until a given task has been completed. Notably, in the navigation structure 210 navigation items may be a parent or child of another navigation item. For example, when navigation item 212 is active, navigation item 214 may be a child to navigation item 214. However, when navigation item 214 is active, navigation items 214 may be a parent to navigation item 212.

Illustrating now an exemplary method of assembling a navigation structure, a developer may wish to add child or related navigation items. Notably, as discussed previously, navigation items may be implemented using simple or composite parts such as those illustrated in FIG. 1. Navigation connection points can be used to implement certain functionality. For example, navigation connection points may provide methods that activate and deactivate child parts, such as in the hierarchical navigation structure 202. In the flat navigation structure 210, navigation connection points may control the activation state of other parts when a new part is navigated to. For example, navigation connection points can be used to deactivate the previous part when stepping through a wizard navigation. Navigation connection points can provide a property that describes the navigation structure. In one embodiment, this may be stored as a tree of navigation entries. Additionally, navigation connection points can provide events that fire when child parts are activated or deactivated. This allows a navigations structure's view to respond to these events and display or hide a child's view as needed.

In one embodiment, when a user adds a child part to a navigation structure, the part is connected to a navigation connection point. Child parts are not necessarily added to a parts childpart collection. By adding a child part to a navigation structure by connecting to a navigation connection point, the navigation connection point serves as the logical child part collection. The navigation connection point manages the child part collection as well as the active state of each child part.

In a simple case, where a developer simply wants to show all views available in a navigation structure immediately, one embodiment uses a default navigation connection point to accomplish this functionality. For example, a navigation connection point may have a default function that creates a navigation entry when a child part is added to the default navigation connection point that will be activated as soon as the navigation structure is loaded. When the navigation entry is activated, it will create the child part (if it has not yet been created) and fire events indicating that the child part's view should be shown.

More complex navigation connection points can delay activation of a navigation entry. For example, a wizard navigation connection point, in one embodiment, activates one child part at a time and activates only a first part when the navigation structure is loaded.

Navigation connection points can be controlled programmatically. However, in some embodiments, components may include inherent navigation knowledge to allow the component to interact with a navigation connection point. For example, two components are described herein that are "navigation-aware", Navigators and Workspaces. Both of these are specific to a UI technology and therefore used in views.

Navigators are UI controls that can call methods on the navigation connection point to activate or deactivate child parts. They may also display what child parts can be navigated to and/or what child parts have already been navigated to.

Workspaces subscribe on navigation connection point activation events to show and hide child part views.

Navigation structures can host multiple child parts, navigation items, or sub-navigation structures, that combine to implement a use-case or task or to provide functionality related by some context. Navigation structures, as described previously may include a body part component that implements the business logic and state, and a view part that provides the user interface. For example, in FIG. 1, the part 104 may implement the business logic while the UI part 108 implements the view that provides the user interface. The body part and its view part combine to deliver a user experience that is consistent with the underlying use-case or task being implemented.

In the following discussion, it should be kept in mind that a part may be a composite part. Even child parts, which are sub-parts of a part may be themselves composite parts. Thus, when reference is made to a part, the reference may be referring to a composite part that may implement an entire navigation structure, such as navigation structures 202 and 210, or a part may refer to a logic used to implement a navigation item such as items 204-208 and 212-218. Part may also refer to the logic used to implement a navigation item view or a navigation structure view. The functionality can best be discerned by context.

Parts can also be re-skinned. For example, a developer can create a new view that re-uses the part's underlying business logic and state. In one embodiment, a developer can provide a new user interface sub-part. Alternatively, the developer can edit an existing user interface part to implement a desired skin effect.

Sometimes a part will provide relatively unstructured access to its child parts, allowing the user to see all children at once and to interact with them in any order. At other times, the part may require a more structured interaction with the user.

To do this it would employ a navigational structure to guide the user's interaction with the part's child parts in a specific way.

The part's navigational structure effectively controls the way in which the user can interact with the child parts, including the order in which they can be displayed, how they are laid out within the user interface, and the way in which the user can navigate between them. The navigational structure may also impose certain constraints and limitations to ensure that the child parts are kept in a consistent state throughout the process, for example by validating the data or state of each child part before allowing the user to navigate to a different part.

For example, a part may implement a wizard-like process which guides the user through a number of separate steps, where each step is defined by a child part. The part displays one child part at a time in wizard-like style, stepping the user through the overall process and validating their input at each step. The part may additionally allow the user to navigate forward or backwards through the steps so that they can review the data that they have entered before it is submitted.

Figure 3:
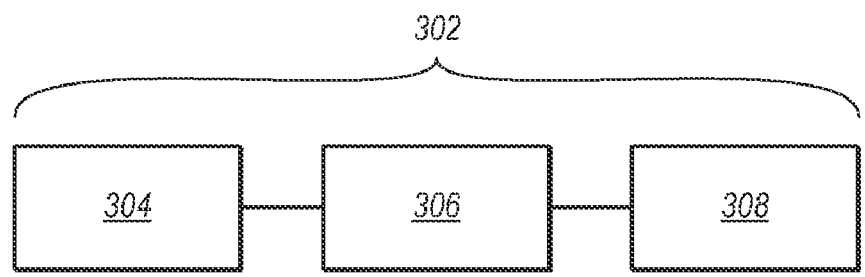
FIG. 3 illustrates inter-relationships between a navigation structure, a composite part, and a user interface.
Figure 3:
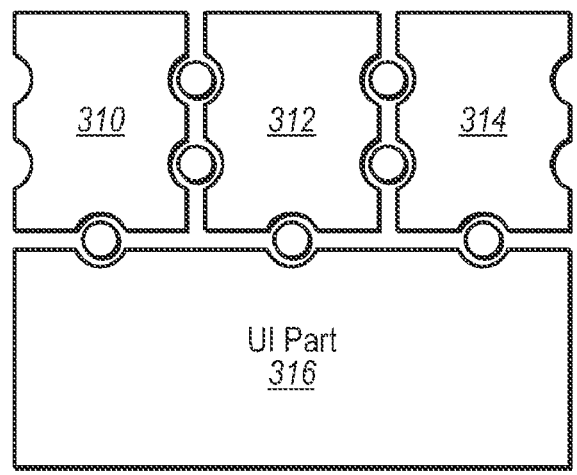
Figure 3:
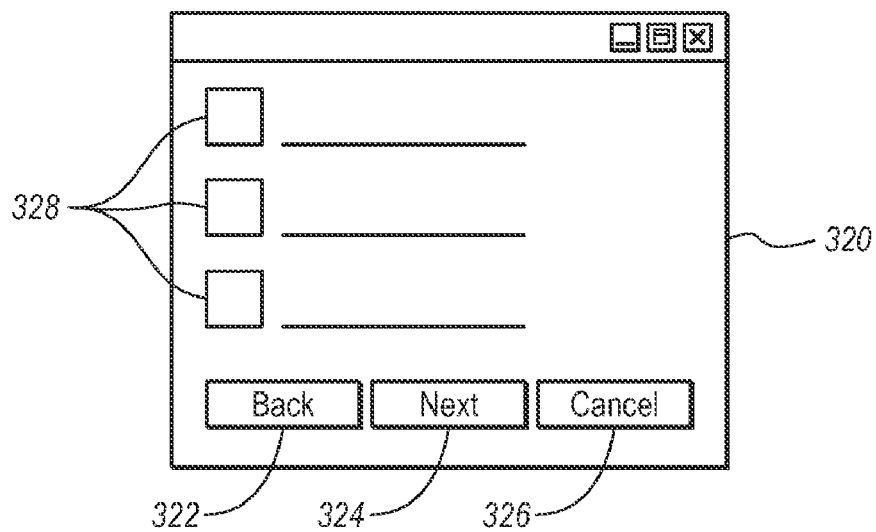

Referring to FIG. 3, such an example is illustrated. FIG. 3 illustrates a navigation structure 302. The navigation structure 302 includes three navigation items 304, 306, and 308. Each of the navigation items may represent a specific task performed by a different portion of a wizard interface. The navigation structure may be implemented by three business logic parts 310, 312, and 314. For example, the functionality of navigation item 304 may be implemented by part 310. The functionality of navigation item 306 may be implemented by part 312. The functionality of navigation item 308 may be implemented by part 314.

FIG. 3 further illustrates a UI part 316. UI part 316 implements a user interface. In the particular example, the UI part 316 implements a graphical user interface 320. The graphical user interface 320 is shown with various graphical controls and informational items. For example, the graphical user interface 320 includes a back button 322, a next button 324, and a cancel button 326. The graphical user interface also includes a number of user selectable check-boxes 328 and accompanying informational data. Graphical controls and informational data displayed may be dependent on which part is active. For example, if part 310 is active, the back button 322 may be inactive because there are no child parts that can be navigated to from that button. If part 312 is active, the back button may be active to allow navigation to part 310.

A navigation structure such as navigation structure 302 may be represented in various ways. For example, a collection of navigation items can be represented as an ordered flat list, a grouped list, a hierarchy, or in any combination of these. This enables navigation behaviors, discussed in more detail below, to express highly structured or completely unstructured navigation structures or anything in between.

A view of a computer implemented navigation module can be displayed at a UI. For example, the navigation structure 302 may be represented in the graphical user interface 320 as will be discussed in more detail below. Notably, the UI part 316 can be built to work with a specific style of navigation behavior so that it can be re-used and plugged into many different instances of a specific navigation component, such as a composite part including parts 310, 312, and 314. The layout logic is re-usable and may be automatically provided by the UI part 316. Illustratively, a specific UI part may be configured with layout logic suitable for different wizard type interfaces. Alternatively, a UI part may be suitable for hierarchical navigation.

A navigation item generally, but not always, maps to a specific part that can be displayed. For example, in FIG. 3, navigation item 304 maps to part 310. Navigation item 306 maps to part 312. Navigation item 308 maps to part 314. When the navigation item is selected in the UI, the corresponding part is displayed in the UI (if validation rules are satisfied). For example, if the graphical user interface 320 represents the graphical user interface when part 312 is active, selection of the back button 322 select the navigation item 304 and causes part 310 to be displayed. In some cases it may advantageous to represent a non-existent child part as a navigable item. This allows a part to implement the following scenarios:

Load on Demand—A user interface may present an item but only when the user selects that item does a complex part actually create, initialize and display the corresponding child part.

Navigation Operations—A part may choose to represent certain operations as navigable items. For example, the navigation behavior might allow the user to create new instances of an item (e.g. a new order, customer, project, etc). This operation can be represented using a 'New . . . ' navigation entry. When the user selects this item, a new child part is created and then displayed. Similar scenarios include Cancel or Submit operations.

To support the creation of custom part views (re-skinning), an underlying part component is able to specify a navigation style that the part implements so that the view can provide an appropriate user experience. If a custom part view implements a user interface that is inconsistent with the navigational structure of the underlying component, it could lead to a confusing user interface, or a user interface that fails to enforce the business logic implicit in the part's choice of navigational model making the application all but unusable. For example, it may not be appropriate for a custom view for a step-by-step order form process to show all child parts at the same time and allow the user to interact with them in any order.

To facilitate efficient implementation of parts, specific navigational patterns may be implemented. These behaviors define the interaction between the part and its view in terms of the navigational structure. Specifically, user interface navigational behaviors may: specify what child parts are to be shown and when; specify what child parts can be shown and when; specify what navigational operations are supported (e.g. forward/backward, etc); specify whether validation occurs before and/or after navigational operations; etc.

In one embodiment, a developer user interface may be implemented to allow a part developer to simply drag and drop a pre-built navigation behavior onto a part and then configure it to suit the desired functionality. A part developer can then implement the application specific logic instead of having to recreate common navigational patterns again and again from scratch.

Conversely, a UI designer who is tasked with creating a view for a part will be able to inspect the part's navigation behavior and create a user interface that is compatible with it. Given a part's specific navigation requirements, a view part is free to implement whatever user interface it wants as long as it supports the underlying navigational structure. For example, a view may implement a graphical user interface, voice commands, hot keys, a combination of the above, or any other suitable interface by pairing a user interface agnostic part with a selected user interface part providing the desired functionality.

Often, a view will utilize UI elements that can interact directly with the part's navigation behavior to provide plug and play construction of views. For example, a control that implements a Forward/Back button pair can be plugged into a wizard navigation behavior directly.

In one embodiment, navigation UI behaviors implement a specific underlying navigation structure by implementing its logic and by managing its associated state, and by providing an internal and external API. In some cases, the logic and state associated with a navigation structure will be simple and straightforward. In other cases it may be complex. Simple navigation behaviors may be implemented, for example, by code. More complex or flexible navigation behaviors can be implemented, for example, using a workflow.

The internal and external API's defined by a specific navigation behavior define how the part and its view can interact and communicate with each other. This communication may be a two way negotiation, though in one embodiment, the part always has ultimate control. For example, a complex part may want to display a sub-part and as such, the complex part can tell the view to simply display it. Conversely, the user may want to navigate to a different sub-part. In this case, the view asks the part for permission so that the part can save or validate the data in the currently displayed sub-part.

Embodiments are also able to be implemented to facilitate single document interface style applications to manage a number of documents at any one time but display and let the user interact with only one at a time. Stated differently, a user may only able to interact with a single document even though they can open multiple documents at a time. The user can typically navigate to other open documents in a variety of ways, including via menu items, toolbars, tabs, CTRL-TAB shortcut keys, etc.

This navigation style is not specific to applications that manage documents but can be applicable to any application which manages multiple items only one of which is displayed at a time. The items can be documents, forms that display order or customer information, etc.

A single document interface navigation behavior may encapsulate the single document interface navigation structure. This navigation structure is very simple and essentially includes a collection of zero or more navigation items, only one of which can be active at any one time. Each navigation item represents a part, whether simple or composite, that the user can choose to interact with.

The single document interface navigation behavior defines a simple navigation structure which can be represented within a user interface in many ways. For example, the part's view can choose to display the list of available navigation items as menu items, a toolbar, a drop-down box, tabs, etc, or a combination of all these. This gives the UI designer a great deal of flexibility and allows them to define a look and feel that is most appropriate to their needs.

The functionality of an exemplary single document interface part is now illustrated. A part creates navigation item objects that represent each of its child parts. These then get added to the navigation behavior's navigation items collection. As they get added to the behavior, the view is informed, for example via an event, that a new navigation item has been added. The view then updates its user interface which displays the collection of navigation items in an appropriate way so that a user can select one of them.

When the user selects a navigation item, the view asks the navigation behavior to make this navigation item the current one. An event is then raised with the underlying composite part so that it can deactivate the current sub-part gracefully and activate the desired sub-part. The navigation behavior makes the desired navigation entry the current one, extracts the corresponding part's view and makes it available to the part's view so that it can display it.

Synchronous/Asynchronous Operations

Connection points can be usable in a synchronous or an asynchronous manner. They can provide a synchronous and an asynchronous API for the operations they define. A view or external parts can choose to call the connection point synchronously or asynchronously according to a developer's requirements and/or skill level.

Connection points that are called asynchronously can report progress, such as via an event, so that the view can provide visual feedback to the user while an asynchronous operation is being executed. Connection points may also be configured to allow an executing operation to be canceled. In one embodiment, the connection point will attempt to cancel the operation and then inform the view or external part if the operation was successfully canceled or not.

A connection point may define and maintain state. This state can be used by the view or by external or the parent part as appropriate. For example, a UI behavior that represents a long running operation may define an "enabled" property that the view can query to see if an operation can be started at that time. A UI behavior that represents data can make the data available as state that can then be bound to the user interface using whatever data binding mechanism is available.

For connection points that are called in an asynchronous manner, the connection point processes requests that are sent to it by the view or an external part on a separate thread. To minimize the burden of multi-threaded programming, in one embodiment, connection points can queue requests and process them in a number of different ways.

In one embodiment, connection points that are called in an asynchronous manner can be configured to process requests in a certain way by specifying its "Operation Execution Mode". This allow a developer to specify whether or not requests are to be executed in series or in parallel, or whether they are to be queued, merged, or batched. This allows connection points to provide a great deal of flexibility allowing them to be configured to match specific application scenarios. The following are various examples of asynchronous operations.

Serial Execution—A UI Behavior can be configured to only allow one request to be processed at a time. Any attempt to send a second request while a previous one is being processed will result in a run-time exception. Examples of this kind of behavior may include 'Submit' operations where the operation should be executed at most once and where it wouldn't make sense to allow the operation to be executed while a previous operation is in progress. This execution mode provides a locking mechanism, removing the burden on the part developer to provide suitable locking logic within the operation's implementation because it will only ever be executed by one thread at a time.

Parallel Execution—A UI Behavior can be configured to process multiple requests in parallel. This allows the view to send as many requests as it likes and each one will be executed in parallel by the behavior. Results from each request are passed back to the view via callback events (which may be out of order with respect to the original requests). In this case, a part developer ensures that the operation implements suitable locking to prevent internal data corruption since the same operation will be executed simultaneously on multiple threads. Examples of this kind of behavior may include lengthy operations or asynchronous data retrieval based on a per-request query or parameter, for example a tax calculated based on a zip code, or retrieval of customer details whose surname begins with a specific letter, etc.

Queued Execution—A UI Behavior configured for queued execution which allows the view to queue up multiple requests. Each request is then handled in series in the order in which they were received. This is similar to the serial execution mode but does not result in a run-time exception if more than one request is sent while a previous request is being executed. Again, this kind of execution provides a simple locking mechanism allowing a part developer to write simpler code that will not be executed on multiple threads simultaneously. Examples of this type of operation may include lengthy operations or asynchronous data retrieval.

Merged Execution—A UI Behavior can be configured to allow multiple requests to be merged. This is suitable for operations that such a 'Refresh' or 'Sync' operations where multiple requests occurring very close to each other can be merged into a single request and thereby handled more efficiently. This also allows the part to efficiently handle over enthusiastic users who press the Refresh button multiple times.

Batched Execution—Batched execution allows a UI Behavior to process multiple requests at one time. The behavior, for performance or efficiency reasons, may only need to execute once it has a sufficient number of requests.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions.

For example, in one embodiment, a computer readable storage medium may include computer executable instructions usable in a navigation framework for implementing navigation business logic separated from user interface elements such that the navigation business logic and user interface elements can be developed separately and later combined. The computer readable storage media may include computer executable instructions configured to perform navigational tasks. For example, computer executable instructions may be configured to implement the business logic part 104 where the business logic part 104 is configured to perform a navigational task.

The computer readable storage media may further include instructions for implementing a computer implemented interface operatively coupled to the computer executable instruction configured to perform navigational tasks. For example, the connection points 110-126 may implement one or more computer implemented interfaces. The computer implemented interface may be configured to connect to an external computer implemented user interface module. For example, the connection points 116-120 may be configured to connect to user interface parts such as UI part 108. The computer implemented interface may allow an external computer implemented user interface module to be selected from one of a number of external computer implemented user interface modules. In particular, a UI part may be selected from one of a number of different UI parts. In one embodiment, the UI part may implement a user interface that is a graphical user interface. In another embodiment, the user interface may implement an interface based on hot keys. Still other embodiments may include voice commands, mouse movements, video input, tablet input, touch screen input, or any other suitable input.

In one embodiment, the computer executable instructions configured to perform navigational tasks are user interface agnostic. For example as illustrated in FIG. 1, the business logic part 104 is not concerned with how input is received from the UI part 108 or how data is displayed or otherwise presented at the UI part 108, but rather is only concerned with the UI part's ability to comply with the contractual requirements of the connection points 116-120.

In one embodiment, computer executable instructions configured to perform navigational tasks include one or more groups relating one or more properties, methods and/or events. For example, the business logic part 104 may be a composite part that includes a number of sub-parts with related functionality.

The computer executable instructions configured to perform navigational tasks may be configured to perform navigational tasks asynchronously. For example, as described above, various controls and operation modes may be implemented to ensure that errors do no occur during asynchronous operation. In one embodiment, asynchronous operation may be facilitated when the computer executable instructions configured to perform navigational tasks are configured to report progress via an event.

The computer readable storage medium may also include a computer implemented connection interface connected to the computer executable instructions configured to perform navigational tasks such that the computer implemented connection interface is configured to interface with other computer executable instructions configured to perform navigational tasks. For example, as described above a composite part may be created by connecting connection points on sub parts. The connection points may function as the computer implemented connection interface connected to the computer executable instructions configured to perform navigational tasks.

The computer implemented connection interface may be derived from a common set of properties, methods and events. The common properties methods and events can then be customized for a particular application.

In another embodiment, computer executable instruction may be implemented on computer readable media to implement user interface functionality. For example, a computer readable storage media may include computer executable instructions configured to perform user interface tasks. For example, computer executable instructions may be configured to perform the functionality of the UI part 108 described above.

The computer readable storage medium may further include a computer implemented interface operatively connected to the computer executable instruction configured to perform user interface tasks. The computer implemented interface is configured to connect to an external computer implemented navigation module. For example, the connection points 132, 134 and 136 may function as a computer implemented interface configured to connected to an external computer implemented navigation module, such as the business logic part 102.

The computer executable instructions configured to perform user interface tasks may include a graphical user interface, such as the interface illustrate at 320 in FIG. 3. When a graphical user interface is implemented, the computer executable instructions may be configured to implement toolbar buttons, checkboxes, interactive buttons, menu items, etc.

The computer executable instructions configured to perform user interface tasks may also implement user interface items that have no or fewer graphical interfaces. For example, the computer executable instructions configured to perform user interface tasks may include one or more shortcut key commands, mouse interactions, voice commands, video input commands, graphics tablet commands, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a system usable in a navigation framework for implementing navigation business logic separated from user interface elements such that the navigation business logic and user interface elements can be developed separately and later combined, the system comprising:

a computer implemented navigation module implemented by one or more processors executing instructions stored on a computer readable medium, the computer implemented navigation model implementing a business logic part configured to perform navigational tasks based on user input from a user interface part coupled to the business logic part, wherein the business logic part is implemented such that the navigation module is user interface agnostic in that the business logic part is not concerned with how user input is received at the user interface part and how a user interface implemented by the user interface part is presented to a user, but rather the business logic part comprises connection points that can be used to connect to any user interface part with mating connection points and suitable for a navigation style of the business logic part, wherein the business logic part comprises:

at least one command connection point, wherein command connection points include at least a enabled property specifying whether or not the command is enabled;

at least one data connection point, wherein data connection points encapsulate data exchanged between parts; and at least one navigation connection point, the navigation connection points usable for defining a navigation model defining what navigation items can be navigated to and proffering events when entries change their state, and further comprising methods to activate and deactivate navigation parts when navigation parts are navigated to; and a computer implemented interface implemented by one or more processors executing instructions stored on a computer readable medium, the computer implemented interface operatively coupled to the computer implemented navigation module, wherein the computer implemented interface is configured to connect the connection points to an external computer implemented user interface module implementing a user interface part, wherein the computer implemented interface allows an external computer implemented user interface module to be selected from one of a number of external computer implemented user interface modules so long as the computer implanted user interface modules comprise mating connection points to the business logic part.

2. The system of claim 1, wherein the computer implemented navigation module comprises one or more groups relating one or more properties, methods and/or events, wherein the groups allow available navigation tasks to be grouped together while allowing a user interface module to expose functionality of the related properties, methods and/or events in a manner appropriate to the user interface module.

3. The system of claim 1, wherein the business logic part is configured to perform navigational tasks asynchronously.

4. The system of claim 3, wherein the business logic part is configured to report progress via an event.

5. The system of claim 1, further comprising a computer implemented connection interface, implemented by one or more processors executing instructions stored on a computer readable medium, coupled to the business logic part, the computer implemented connection interface configured to interface with other business logic parts implemented using computer executable instructions configured to perform navigational tasks.

6. The system of claim 5, wherein the computer implemented connection interface is derived from a common set of properties, methods and events.

7. The system of claim 1, wherein the business logic parts comprises a plurality of navigation sub-modules parts interconnected by computer implemented connection interfaces.

8. The system of claim 7, wherein the plurality of navigation sub-modules parts are child parts arranged in a hierarchical fashion, and wherein at least one navigation connection point comprises events that fire when child parts are activated or deactivated.

9. The system of claim 7, wherein the plurality of sub-modules parts are arranged in a flat fashion.

10. The system of claim 1, wherein the computer implemented interface operatively coupled to the computer executable instruction configured to perform navigational tasks comprises computer executable instruction to implement at least one of notifications, command invocations or data exchanges.

11. In a computing environment, a computer readable storage medium comprising computer executable instructions usable in a navigation framework for implementing navigation business logic separated from user interface elements such that the navigation business logic and user interface elements can be developed separately and later combined, the computer readable storage comprising:

computer executable instructions implementing a user interface part configured to perform user interface tasks including displaying and receiving user navigation interactions according to a particular navigation style designed for the user interface part, wherein the user interface part comprises connection points that can be used to connect to any business logic part configured to perform navigational tasks with mating connection points and suitable for the navigation style of the user interface part, wherein the business logic part defines the navigation style using at least one navigation connection point, the navigation connection points usable for defining a navigation model defining what navigation items can be navigated to and proffering events when entries change their state, and further comprising methods to activate and deactivate navigation parts when navigation parts are navigated to; and a computer implemented interface operatively coupled to the computer executable instruction configured to perform user interface tasks, wherein the computer implemented interface is configured to connect the connection points of the user interface part to connection points of an external computer implemented navigation module.

12. The computer readable storage medium of claim 11, wherein the computer executable instructions configured to perform user interface tasks comprise a graphical user interface.

13. The computer readable storage medium of claim 12, wherein the computer executable instructions configured to perform user interface tasks comprise one or more toolbar buttons, menu items, or checkboxes.

14. The computer readable storage medium of claim 11, wherein the computer executable instructions configured to perform user interface tasks comprise one or more shortcut key commands, voice commands, mouse command, or tablet input commands.

15. In a computing environment, a method usable in a navigation framework for implementing navigation business logic separated from user interface elements such that the navigation business logic and user interface elements can be developed separately and later combined, the method comprising:

receiving user input from a user at a user interface implemented using a user interface part;

transmitting the user input, through connection points on the user interface part, to a computer implemented navigation module implementing a business logic part that is external to the user interface, by transmitting the user input to connection points on the business logic part through a interface adapter connecting the user interface part to the business logic part, wherein the business logic part comprises:

at least one command connection point, wherein command connection points include at least a enabled property specifying whether or not the command is enabled;

at least one data connection point, wherein data connection points encapsulate data exchanged between parts; and at least one navigation connection point, the navigation connection points usable for defining a navigation model defining what navigation items can be navigated to and proffering events when entries change their state, and further comprising methods to activate and deactivate navigation parts when navigation parts are navigated to;

wherein, the computer implemented navigation module user interface agnostic in that the business logic part is not concerned with how user input is received at the user interface part and how a user interface implemented by the user interface part is presented to a user, but rather the business logic part comprises connection points that can be used to connect to any user interface part with mating connection points and suitable for a navigation style of the business logic part; and performing a navigation function as specified by the user input.

16. The method of claim 15, wherein the user interface is a graphical user interface.

17. The method of claim 15, wherein the user interface comprises at least one of hot keys, voice commands, mouse movements, tablet entries, or video input.

18. The method of claim 15, wherein transmitting the user input to an computer implemented navigation module that is external to the user interface comprises transmitting through connection points at the user interface and the navigation module, the connection points defining an external contract.

19. The method of claim 15, further comprising displaying a view of the computer implemented navigation module at the user interface, wherein the user interface comprises a user interface module that is built to work with a specific style of navigation behavior such that it can be re-used and plugged into one or more different instances of a specific navigation component, further wherein layout logic of the user interface module is re-usable and automatically provided by the user interface module.

* * * * *